United States Patent
Hsieh

(10) Patent No.: US 8,280,535 B2
(45) Date of Patent: Oct. 2, 2012

(54) MASSAGE BATHTUB AUTOMATIC CONTROL SYSTEM AND METHOD FOR CONTROLLING THE SAME

(75) Inventor: Chung-hsin Hsieh, Taipei (TW)

(73) Assignee: Dartpoint Tech Co., Ltd., Taipei (TW)

( * ) Notice: Subject to any disclaimer, the term of this patent is extended or adjusted under 35 U.S.C. 154(b) by 295 days.

(21) Appl. No.: 12/647,081

(22) Filed: Dec. 24, 2009

(65) Prior Publication Data

US 2010/0168928 A1 Jul. 1, 2010

(30) Foreign Application Priority Data

Dec. 24, 2008 (TW) ................................ 97150410 A

(51) Int. Cl.
*G06F 19/00* (2011.01)
(52) U.S. Cl. .......................... 700/83; 700/275; 307/11
(58) Field of Classification Search ................. 700/83, 700/275, 283; 307/11
See application file for complete search history.

(56) References Cited

U.S. PATENT DOCUMENTS

| | | | | |
|---|---|---|---|---|
| 5,086,385 A * | 2/1992 | Launey et al. | .................. | 700/83 |
| 6,407,469 B1 * | 6/2002 | Cline et al. | ...................... | 307/11 |
| 6,587,739 B1 * | 7/2003 | Abrams et al. | .................. | 700/83 |
| 6,643,108 B2 * | 11/2003 | Cline et al. | ...................... | 361/42 |
| 6,747,367 B2 * | 6/2004 | Cline et al. | ...................... | 307/11 |
| 7,419,406 B2 * | 9/2008 | Brochu et al. | ................ | 439/677 |
| 2005/0090915 A1 * | 4/2005 | Geiwitz | .......................... | 700/90 |
| 2005/0151425 A1 * | 7/2005 | Brochu et al. | .................. | 307/11 |
| 2008/0271238 A1 * | 11/2008 | Reeder et al. | ..................... | 4/597 |

* cited by examiner

*Primary Examiner* — Michael D Masinick

(57) ABSTRACT

The present invention discloses a massage bathtub automatic control system and method for controlling the same, which provides a control panel and a digital control unit, wherein the control panel is disposed with a visual-displaying unit, a master control device and an input device connected to the master control device. The visual-displaying unit displays multi-layer function menus where a user can use the input device to pick up one of function icons appearing. The picked up function icon corresponds operation of at least one of attaching devices or operations of combining the plural attaching devices connected to the bathtub, and simultaneously, the control panel sends a related control command to the digital control unit for performing such an operation on the corresponding attaching device. The operational result of the corresponding attaching device can be sent back to the control panel for data process. Therefore, this brings the user conveniences on rapid and simplified operation and watching the control performance in time.

20 Claims, 4 Drawing Sheets

MASSAGE BATHTUB AUTOMATIC CONTROL SYSTEM AND METHOD FOR CONTROLLING THE SAME

BACKGROUND OF THE INVENTION

1. Claim of Priority

This application claims priority to Taiwanese Patent Application No. 097150410 filed on Dec. 24, 2008.

2. Field of the Invention

The present invention relates to a massage bathtub automatic control system and a method for controlling the same, and more particularly, to a massage bathtub automatic control system which provides a simplified operability.

3. Description of the Prior Art

As commonly known, there are many various types of massage bathtubs addressing the market requirements, for example, one type of which might have a water-jetting element, a spa device, a bubble-generating element, a temperature-based control/inspecting element, a light effect control element or the likes of the above-mentioned functional elements. Most of the above-mentioned functional elements can independently operate by individually disposing a corresponding electrical-control switch/valve/sensor thereto. It represents that an interaction/interrelation among the above-mentioned functional elements can not be established. In application, it is essential for the user to individually adjust/set the above-mentioned functional elements on the different demands, and remember how to function and to control on each of the functional elements. Those usually invoke inconvenience on element operations.

Lately, a kind of massage bathtub as disclosed in a Taiwanese Patent Issued No. 574, 034, titled with "a touch panel for a multi-function massage bathtub" is introduced, which utilizes a central processing unit (CPU) to posses two different control systems, and thereby respectively performs controls of two different motors, based on both of which one of various buttons disposed on the touch panel is manipulated by the user and what are the effects of different LED lamps after identified. However, the prior art can only individually operate one of the functional elements, for example, an adjustment of motor rotation speed, operation timing, an adjustment of water level, or the likes of the above-mentioned simple functions, but cannot automatically combine multi-functions into a best or most preferred functional setting simultaneously to facilitate the user performing simple operations. In addition, the user has to refer to the effects of different LED lamps on the touch panel, and meanwhile, manipulate one of various buttons disposed on the touch panel, so the user has to acquaint himself with the operations process of the massage bathtub to press buttons correctly. For example, the user has to refer to the LED lamps to determine to perform a first control system and/or a second control system, and thereby to perform speed adjustments of a first motor and/or a second motor respectively. It lacks functions of automatic detection and performance feedback on system integration. And the above-mentioned problem still exists; that is, it is not convenient for the user to perform sophisticated functions, such as a best or most preferred control setting.

SUMMARY OF THE INVENTION

In order to solve the problem of the prior art, one primary object of the present invention is to provide a massage bathtub automatic control system and a method for controlling the same. The present invention comprises a control panel connecting a visual-displaying unit (e.g., an LCD) and utilizes highly operated graphical user interface (GUI) to generate a function menu frame which combines different kinds of function icons to allow the user to choose directly without restrictions via a input device (e.g., a button), and the plurality of function icons correspond to the operation of one of the attaching devices of a massage bathtub or to the combinational operation of several of the attaching devices of a massage bathtub. By means of this, the user can operate the massage bathtub quickly and conveniently and supervise the control effects.

Meanwhile, another object of the present invention is to provide a massage bathtub automatic control system and a method for controlling the same, comprising a control panel connecting a digital control unit in order to integrate all of the functions of the massage bathtub and provide an automatic system detection and feedback, so it is unnecessary for the user to particularly memorize a best or most preferred control setting combinations to adjust the functions one by one.

According to the present invention, a massage bathtub automatic control system for use in a massage bathtub with a plurality of attaching devices comprises a control panel and a digital control unit. The control panel comprises a visual-displaying unit and a master control device connected to an input device. The visual-displaying unit can be a LCD to show a multi-layer function menu which is manipulated by the user. The function menu comprises a plurality of function icons, at least one function icon comprising at least one set item corresponding to an operation of the attaching device in single or in combination. A microprocessor transmits at least one corresponding command to a first interface bus in response to one of the set items selected or/and set by the input device The master control device comprises a microprocessor, a memory, a graphic unit, a universal asynchronous receiver/transmitter (UART) connecting to a first interface bus, an I/O and digital-to-analog converter, a plurality of communication interfaces, a pump management subsystem, a blower management subsystem, an air valve management subsystem, a light unit management subsystem, a heater management subsystem, and a primary management subsystem.

The digital control unit comprises a microcontroller, a plurality of control logics and/or driving elements, a core unit and a power supply unit. The microcontroller is used for controlling the operation of one of the attaching device or the operation of a combination of attaching devices, based on the at least one corresponding command from the first interface bus, and for returning a result of the corresponding attaching device to the control panel.

According to the present invention, a method of automatically controlling a massage bathtub connecting a plurality of attaching devices is provided. The method comprises the following steps:

providing a digital control unit and a control panel comprising a visual-displaying unit and a master control device connected to an input device;

turning on a power switch on the control panel to initialize the control panel;

showing a function menu with the visual-displaying unit, the function menu comprising a plurality of set items, and each set item corresponding to an operation of one of the attaching device or an operation of a combination of attaching devices;

selecting one of the set item by using the input device to generate at least a control command by the master control device; and the digital control unit controlling the operation of at least one corresponding attaching device based on the control command, and returning the operational result of the corresponding attaching device to the control panel.

These and other objectives of the present invention will become apparent to those of ordinary skill in the art after reading the following detailed description of the preferred embodiment that is illustrated in the various figures and drawings.

DETAILED DESCRIPTION OF THE PREFERRED EMBODIMENTS

Figure 1:
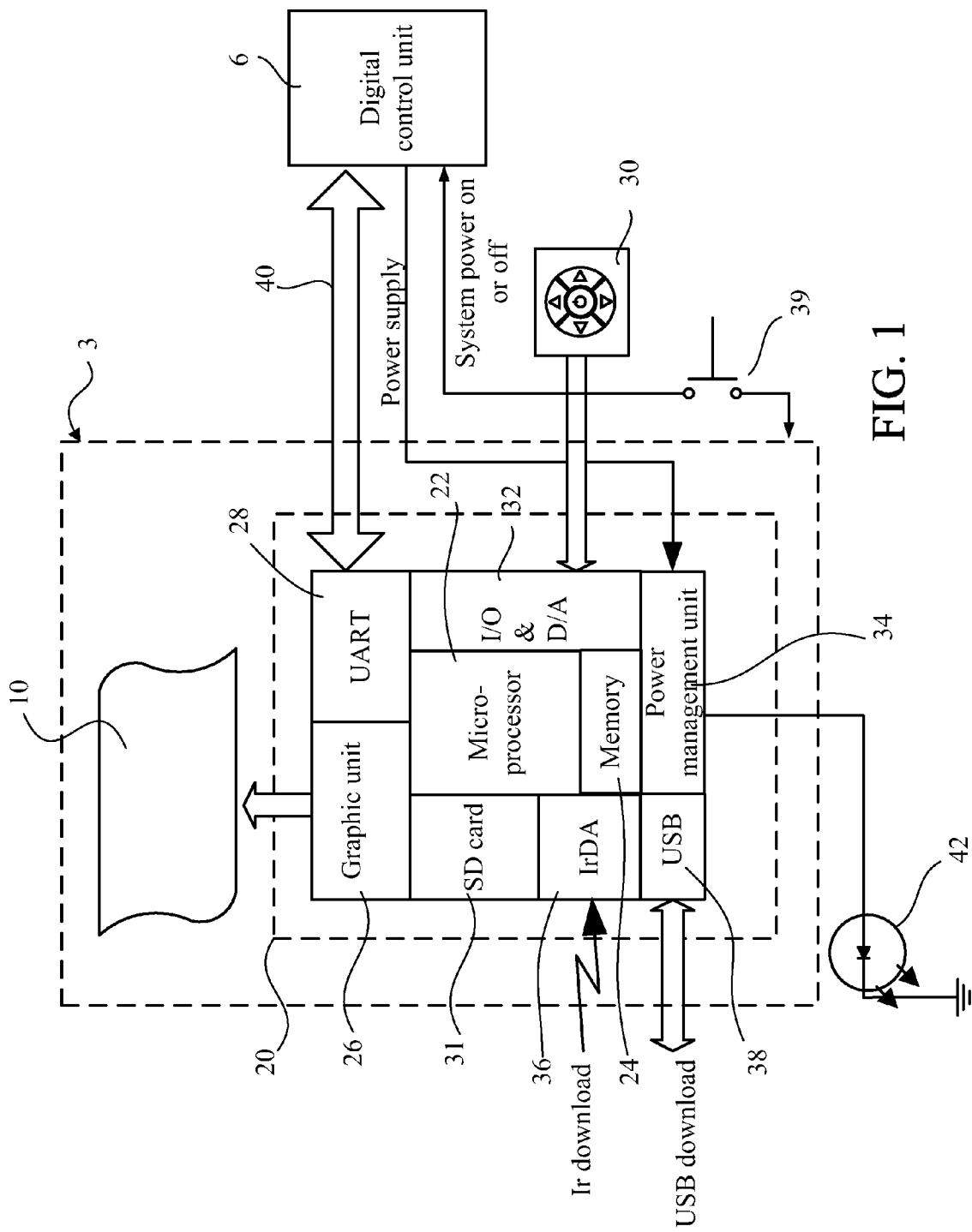
FIG. 1 shows a control panel of a massage bathtub automatic control system according to a preferred embodiment of the present invention.
Figure 2:
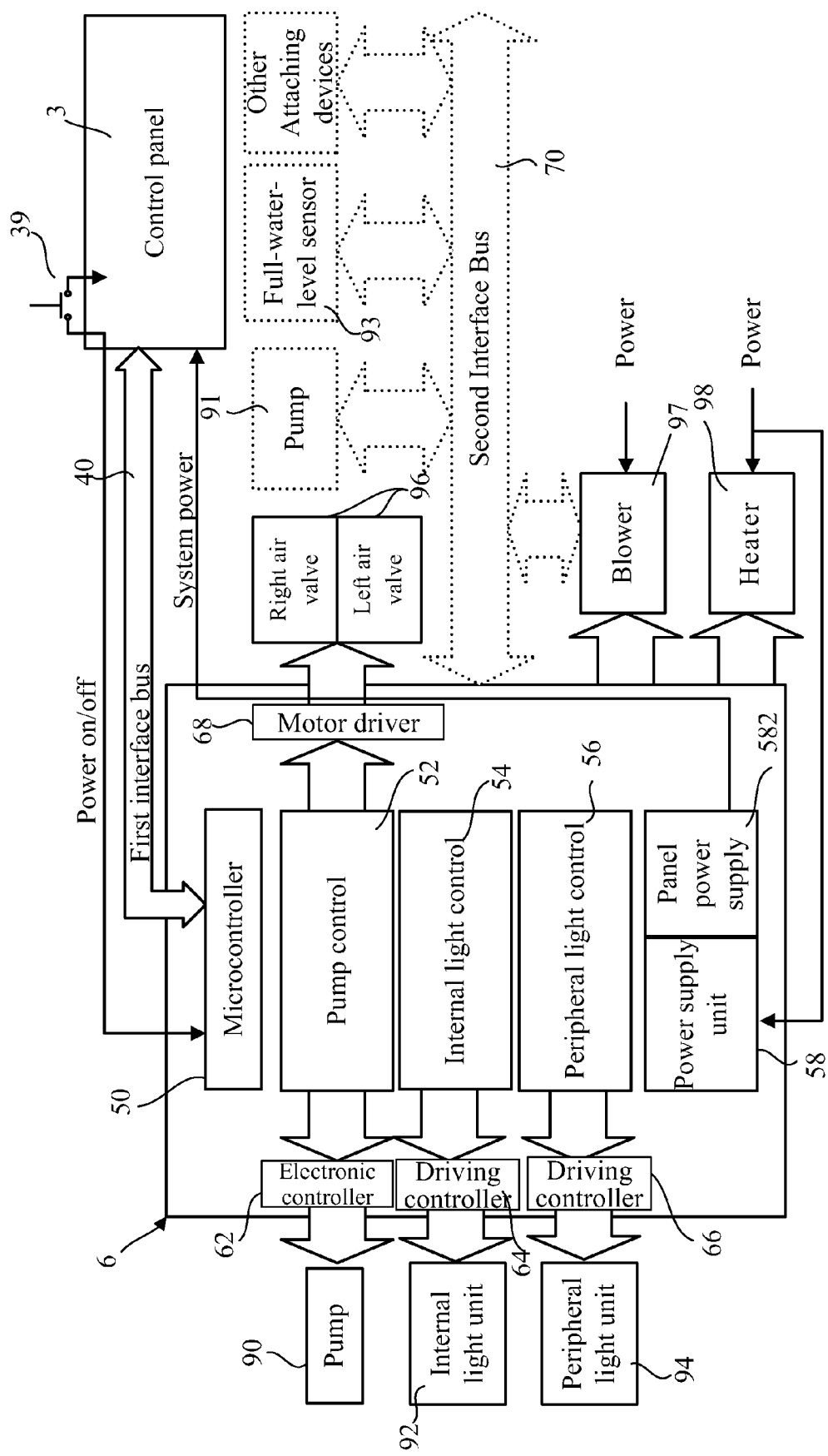
FIG. 2 shows a digital control system of a massage bathtub automatic control system according to a preferred embodiment of the present invention.

Referring to FIG. 1, FIG. 1 shows control panel of a massage bathtub automatic control system 1 according to a preferred embodiment of the present invention. The massage bathtub automatic control system 1 is for use on a massage bathtub (not shown) where a plurality of attaching devices are disposed. As shown in FIG. 2, the plurality of the attaching devices comprise a blower 97, a motor, left/right air valves 96, various light units 92 and 94, pumps 90 and 91, a heater 98, various sensors 93, a timing device (e.g., a timer), a spa device, etc. However, the applications of the present invention are not limited to the above-mentioned elements, in other embodiment, other attaching devices can be added with different demands.

The massage bathtub automatic control system 1 comprises a control panel 3 and a digital control unit 6. The control panel 3 further comprises a visual-displaying unit 10 and a master control device 20 connecting to an input device 30. In this embodiment, the visual-displaying unit 10, which may be a liquid crystal display (LCD), shows a multi-layer function menu for the user to operate depending on the information provided by the master control device 20. The function menu comprises a plurality of function icons so the visual-displaying unit 10 switches to another frame linking a chosen function icon from the function menu frame when the user select at least one of the function icons from the function menu frame shown by the visual-displaying unit 10, among which at least one of the set items corresponds to an operation the attaching devices in single or in combination.

In the present embodiment, the input device 30, formed on the control panel 3, comprises a set of direction buttons, a set of hotkeys, and a confirmation button. The set of direction buttons consist of four buttons representing up, down, left, and right directions. After the plurality of direction buttons are pressed by the user, an indication signal is generated and then moves vertically or horizontally on the function menu shown on the visual-displaying unit 10 by which the user can select the required function icons and the set items to adjust the setting status. Each of the hotkeys links to one of the specific function icons shown on the visual-displaying unit 10. After the hotkey is pressed, the specific function icon and set item are directly shown on the visual-displaying unit 10 and performed. In another embodiment, the input device 30 is directly disposed on the visual-displaying unit 10 to form a touch display so that the user can directly select the specific function icons and/or the set items shown on the visual-displaying unit 10 is performed. In another embodiment, the input device 30 can also be a wireless remote controller including all of the sets of above-mentioned buttons and hotkeys to be utilized to control remotely and to select the function icons and the set items shown on the visual-displaying unit 10. In the present embodiment, the control panel 3 automatically detects if the user utilizes the input device 30 on the control panel 3 to select the required function icons and the set items and accordingly sets at least one setting status of the attaching device. Once the user has not operated the input device 30 in a while, the visual-displaying unit 10 of the control panel 3 returns to the function menu automatically.

The master control device 20 comprises a microprocessor 22, a memory 24, a graphic unit 26, a universal asynchronous receiver/transmitter (UART) 28 connecting to a first interface bus 40, an I/O and D/A converter (e.g. I/O, a digital to analog converter, or an analog to digital converter) 32, a plurality of communication port interfaces 31, 36, and 38, and a plurality of subsystems (not shown) comprising a pump management subsystem, a blower management subsystem, an air valve management subsystem, a light unit management subsystem, a heater management subsystem, and a primary management subsystem. In other embodiments, the control panel 3 can be a portable wireless remote controller using batteries for power supply. The UART 28 can connect a built-in wireless transmission module (not shown). The first interface bus 40 can be a wireless transmission interface to wirelessly communicate with the digital control unit 6 in lieu of physical wires.

The microprocessor 22 is primarily utilized to control and coordinate the actuation of all of the elements in the master control devices 20 and to manipulate the digital control unit 6. The UART 28 connects between the first interface bus 40 and the microprocessor 22 to handle the transmission of control commands produced by the microprocessor 22 and/or the transmission of operational results of the corresponding attaching device. For example, when the visual-displaying unit 10 shows a set item of one of the specific function icons is selected and/or set by the user via the input device 30, the microprocessor 22 thus produces at least one corresponding control command transmitting to the digital control unit 6 via the UART 28 and the first interface bus 40. And then the digital control unit 6 returns the operational result of the corresponding attaching device to the microprocessor 22 via the first interface bus 40 and the UART 28. In the present embodiment, the first interface bus 40 conforms to the RS-232 communication protocol and is not limit to the scope of the present invention which is defined by the following claims. In other embodiments, specifications of other standard communication protocols can be adopted as well.

The memory 24 is utilized to store an operating system (e.g. WinCE), hardware drive units, human-computer interfaces, various application programs (APs), and various data such as setting data. The human-computer interface such as a graphical user interface (GUI) utilizes the information to show the multi-layer function menu on the visual-displaying unit 10 through the microprocessor 22. To provide the massage bathtub automatic control system 1 with more operating functions, the plurality of APs link some of the function icons of the function menu through the human-computer interface and thereby the user can select and/or set via the input device 30. For example, among at least some parts of the above-mentioned pump management subsystem, the blower management subsystem, the air valve management subsystem, the light unit management subsystem, and the heater management subsystem, exist in the form of several APs managing the operation of the corresponding attaching device; the primary management subsystem also exists in the form of an AP managing the arrangement and operation of the whole system. And further, the plurality of subsystems individually connect the corresponding function icons on the function menu so that the user can select and/or set via the input device 30, which facilitates the user operating the functions quickly. The plurality of APs can still comprise a video player, a music player, a web browser, and so on. With such APs, the user can select and perform the functions like playing music and videos and surfing the network on the function menu of the control panel 3 while utilizing the massage bathtub.

The I/O and D/A converter 32 is utilized to convert the indication signal produced by the input device 30 into a digital input signal which corresponds to a set item of the specific function icons to be selected and/or set via the microprocessor 22 and the human-computer interface. The graphic unit 26 produces the function menu on the visual-displaying unit 10 depending on the human-computer interface. The plurality of communications port interfaces comprise a SD card interface 31, which can access the digital data of the user's SD card such as music files or image files, a infrared ray (IrDA) transceiver interface 36, and a universal serial bus (USB) interface 38, which is adapted to download new versions or configuration settings of software, or is adapted to test the devices.

Further, the control panel 3 is installed with a power switch 39 with which the user can manually power on or off the system power provided by the digital control unit 6, a power management unit 34 connecting the system power provided by the digital control unit 6, and a power indicator light 42 showing if the control panel 3 has power input and providing a power management mechanism to manage the power required by all of the elements of the control panel 3.

After the user selects and/or sets at least one set item of one of the specific function icons shown on the visual-displaying unit 10 via the input device 30 during the process of operating the control panel 3, the corresponding attaching device forms at least one setting status. The microprocessor 22 produces at least one control command through the hardware drive unit and the human-computer interface based on at least one setting status of the set item. Then the microprocessor 22 stores at least one setting status of the set item in the memory 24 and treats the at least one setting status as a latest configuration value of the set item. Next, because the at least one set item is used to correspond to the operation of one of the above-mentioned attaching devices or to the combinational operation of several of the above-mentioned attaching devices, at least one setting status of the set item comprises a single setting or a combinational setting of a variable parameter value, a fixed parameter value, a variable ratio value and a fixed ratio value. The parameter value represents a lamp color, a speed, a brightness, a time, a temperature, an air flowing amount, or an on/off state. For instance, the user can select a specific function icon ("peripheral light unit" or "internal light unit") connecting the light unit management subsystem of the function menu of the visual-displaying unit 10 to make the visual-displaying unit 10 show another page with a function menu comprising a plurality of set items respectively representing a plurality of various lamp colors, a multi-color cycle, and a multi-color cycle speed. The user can determine to operate either one of the lamp colors or a multi-color cycle with a low-speed interval from the internal light unit 92 or from the peripheral light unit 94 shown in FIG. 2. As a result, the present invention provides a color light control. The peripheral light unit 94 positioned outside of the bathtub can even change light colors once detecting the approach of a human.

Also, the user can select a specific set item connecting the blower management subsystem of the function menu shown on the visual-displaying unit 10 via the input device 30. A set item named "blower speed control" represents an adjustable speed range such as from 10% to 100%. The speed range can be adjusted up to 30% by a pull-up of the cursor produced by the direction button on the input device 30. Therefore, when the bathtub finishes being utilized, the blower 97 shown in FIG. 2 can be set to blow air in the speed of 30% five minutes after the water is drained. The blower 97 can also be set to blow air on a fixed duration every day. Even if the control panel 3 is in a power-off condition, it will automatically operate once the setting time comes and automatically close down once the blower 97 finishes blowing air. In this way, the present invention provides a variable-speed blower control.

Also, the user can select a specific set item connecting the pump management subsystem of the function menu shown on the visual-displaying unit 10 via the input device 30. Afterwards, the user can further choose to adjust a motor speed, a left/right air valve speed or a frequency of wavelet.

Also, the user can select a plurality of other specific set items of the above-mentioned primary management subsystem of the function menu shown on the visual-displaying unit 10 via the input device 30 to combine the controls of a plurality of specific set items in the pump management subsystem, the blower management subsystem, the air valve management subsystem, the light unit management subsystem, and the heater management subsystem. For the user's convenience, each of the specific set items of the primary management subsystem such as "situation mode" and "My Favorite" can simultaneously combine and store the setting statuses of the set items in use of the above-mentioned pump management subsystem, blower management subsystem, air valve management subsystem, light unit management subsystem, and heater management subsystem in the memory 24. When the user selects either "situation mode" or "My Favorite" next time, the combinational operation of at least one device cluster grouped by at least one part of attaching devices the same as the present ones can be quickly and simultaneously performed, for instance, simultaneously performing closing the pump, setting the speed of the blower at 25%, turning on the internal light unit, starting the left air valve, automatically draining, and automatically sensing water temperature. Or, the set item "situation mode" is configured, comprising color variations of a plurality of light units following pitch variations in sound and volume variations. In addition, the above-mentioned primary management subsystem can also connect several specific set items. If each of the specific set items is "My favorite," the user can download the combination of the setting status of some of the set items which have been stored in advance. As a result of this, the user only has to select the set item, and then the combinational operation of the device cluster grouped by the corresponding attaching devices is performed. Additionally, the above-mentioned primary management subsystem can further divide the specific set item "situation mode" into more detailed subitems such as "relax mode", "spa mode", "romantic mode", and so on. Each of the subitems can individually connects the combinational operations of at least one device cluster grouped by at least one part of attaching devices. This facilitates the user selecting quickly without setting the items one by one again.

Besides, the primary management subsystem also connects another set item to perform system error tests of the massage bathtub automatic control system 1. It facilitates the user or maintenance personnel understanding where problems occur from error codes contained in the results of the system error tests.

The primary management subsystem also connects another set item to update the software of the massage bathtub automatic control system 1. The primary management subsystem further connects another set item to restore the setting status of each of the set item of the massage bathtub automatic control system 1 to a default value, preventing the user from wrong setting or improper operations. The primary management subsystem also connects at least another set item to show the return operational result from the corresponding attaching device or the previous setting results of the attaching devices on the function menu of the visual-displaying unit 10. Furthermore, the primary management subsystem also connects another set item to allow the user to set a reservation time in advance to perform at least one reservation function icon via the control panel. Afterwards, no matter if the control panel 3 is under conditions of power-off and the digital control unit 6 is in an idle mode, the primary management subsystem can still perform the plurality of reservation functions depending on the beforehand reservation time and the set item. For example, the blower performs the function, one-minute "daily dry cycle," on an appointed and fixed duration every day. Even if the power switch of the control panel 3 is originally under conditions of being turned off by the user, the digital control unit 6 supplies power to the control panel 3 again at this time to initialize the control panel 3 and awaken the digital control unit 6 to perform the reservation function "daily dry cycle." After the reservation function finishes, the digital control unit 6 stops supplying power to the control panel 3 and compel the digital control unit 6 to go back to idle mode again. Further, as shown in FIG. 2, the digital control unit 6 comprises a microcontroller (MCU) 50, a plurality of control logics and/or driving elements, a core unit, and a power supply unit 58. The MCU 50 controls the operation of at least one corresponding attaching device or the combinational operation of a device cluster grouped by at least one part of attaching devices (e.g., the combinational operation of the device cluster grouped by the pump 90 and the internal light unit 92) depending on a control command transmitted from the control panel 3 via the first interface bus 40. And then, the MCU 50 passes back the operational result of the corresponding attaching device to the control panel 3 via the first interface bus 40. The core unit coordinates the above-mentioned control logics and/or driving elements to control the operation of the corresponding attaching device of the massage bathtub depending on the control command transmitted from the control panel 3 via the first interface bus 40. Besides, the core unit performs and notifies the system error tests of the massage bathtub automatic control system 1 depending on the user's request via the control panel 3.

The plurality of control logics and/or the driving elements mainly perform the operation of the corresponding attaching device of the massage bathtub and pass back the operational result of the corresponding attaching device. The plurality of control logics comprise a pump control 52, an internal light control 54, and a peripheral light control 56. The driving elements comprise an electronic controller 62 (e.g., a relay) which drives the pump 90 based on the pump control 52, two driving controllers 64 and 66 which respectively drive the internal light unit 92 (e.g., the light of spa) and the peripheral light unit 94 based on the internal light control 54 and the peripheral light control 56, and a motor driver (e.g., H-BRIDGE) which drives the left/right air valve 96 through a motor control. In addition, the blower 97 and the temperature heater 98, respectively, are also directly controlled by their corresponding control logics and/or driving elements or the MCU 50.

The power supply unit 58 connects a panel power supply 582 and determines whether or not to provide the power management unit 34 of the control panel 3 (as shown in FIG. 1) with system power depending on the MCU 50. As for the power management mechanism provided by the present invention, when the plug of the massage bathtub automatic control system 1 is plugged in a general household socket where commercial power is supplied, the digital control unit 6 initializes automatically. Before the user utilizes the massage bathtub, the digital control unit 6 maintains idle mode but periodically and automatically detects if the power switch of the control panel 3 is powered on or off. If the digital control unit 6 detects that the power switch is powered on, the digital control unit 6 supplies system power to the control panel 3 to initialize the control panel 3 and awaken the digital control unit 6 to enter a normal operational mode. Otherwise, the digital control unit 6 holds in idle mode. In normal operational mode of the digital control unit 6, however, the program operation of the control panel 3 may become abnormal suddenly because of unexpected incidents or other accidents, leading to the breakdown of the massage bathtub. Therefore, the digital control unit 6 also provides a breakdown detection and automatic exclusion mechanism. The digital control unit 6 comprises a timer to determine whether the response of the control panel 3 has timed out or not based on a predetermined response time of the first interface bus 40 (e.g., RS-232). Further, the digital control unit 6 detects if the control panel 3 operates abnormally such as system crashes to determine whether to compel the control panel 3 to reboot or not. In other embodiments, a single digital control unit 6 can utilize many timers to detect many corresponding control panels 3 simultaneously.

In other embodiments, the digital control unit 6 can further comprise a second interface bus 70 which transmits part of control information or operational results between added attaching devices and the control logics and/or driving elements to the MCU 50. The second interface bus 70 can be a communications protocol which is the same as or different from the first interface bus 40 (e.g., RS-232) or can be extended to be a wireless transmission module utilized in the mode of wireless transmission, transmitting part of control information or operational results between the attaching devices and the control logics and/or driving elements. The plurality of the added attaching devices can comprise another pump 91, an automatic full-water-level sensor 93, etc.

Figure 3:
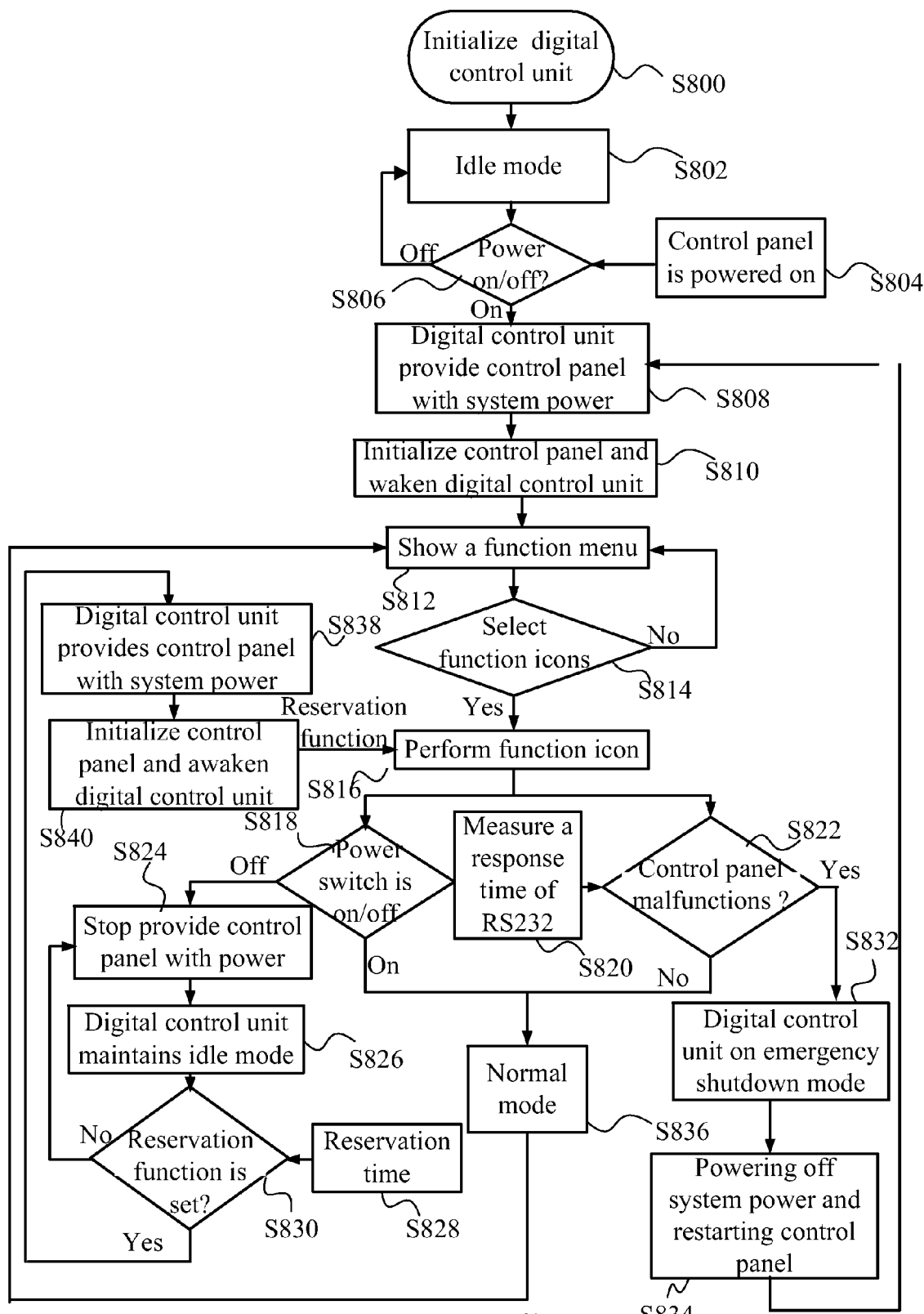
FIG. 3 illustrates a flowchart of a method for controlling the massage bathtub automatic control system which is applied to a massage bathtub according to a preferred embodiment of the present invention.

In addition, as in FIG. 3 shows, the present invention provides a method for controlling the massage bathtub automatic control system which is applied to a massage bathtub disposed with a plurality of attaching devices. Referring to FIG. 1 and FIG. 2, a massage bathtub automatic control system 1 provides a control panel 3 and a digital control unit 6. The control panel 3 comprises a visual-displaying unit 10 which shows at least one function menu and the function icons, a master control device 20 which connects an input device 30, a pump management subsystem, a blower management subsystem, an air valve management subsystem, a light unit management subsystem, and a heater management subsystem to individually manage the operations of the above-mentioned attaching devices and to respectively connect the corresponding function icons on the function menu for the input device to select and/or set, and a primary management subsystem which connects at least one set item to store the setting combinations of the previous set items in the memory of the control panel 3 by which the combinational operation of at least one device cluster grouped by at least one part of attaching devices can be simultaneously performed depending on demands. The method comprises the following steps:

Step S800: Provide the digital control unit with general commercial power to initialize the digital control unit.

Step S802: The digital control unit maintains idle mode.

Step S804: A power switch of the control panel is powered on by the user.

Step S806: The digital control unit periodically and automatically detects if the power switch is powered on or off. When the power switch is powered on, perform Step S808; otherwise, if the power switch remains powered off, loop back to Step S802 even if the digital control unit maintains idle mode.

Step S808: The digital control unit provides the control panel with system power.

Step S810: Initialize the control panel and awaken the digital control unit. The initialization of the control panel may be that, for example, the air valves perform a self examination to make sure that each of the air valves is at the correct home position.

Step S812: The visual-displaying unit of the control panel shows a function menu. The function menu comprises a plurality of function icons corresponding to the combinational operation of at least one of the attaching devices. After any one of the function icons is selected by the user with the input device to form at least one setting status of the attaching device, the at least one setting status, taken as the latest configuration value of the set item, is stored in one of the memories of the control panel. Meanwhile at least one control command is produced by the master control device. Afterwards, the digital control unit controls the operation of at least one corresponding attaching device of the massage bathtub based on the control command and then sends the operational result of the corresponding attaching device back to the control panel, for example, showing the operational result of the corresponding attaching device on the function menu of the visual-displaying unit.

Step S814: The control panel detects if the user utilizes the input device of the control panel to show the function menu from the visual-displaying unit. For example, the user keeps using the direction button of the input device to click the required function icons. The user utilizes the confirmation button to determine the icons of the required function icons and/or to set at least one setting status of the corresponding attaching device. Or, the user directly uses the hotkey to select the required function icons, utilizes the direction button to click, and uses the confirmation button to set least one setting status of the corresponding attaching device. If the user has set the function icons, perform Step S816; if not, perform Step S812; that is, the visual-displaying unit of the control panel goes back to the function menu spontaneously.

Step S816: The digital control unit performs the configured function icons via the control panel depending on the user's preset reservation function or the required function icons which the user directly selects on the function menu of the visual-displaying unit through the input device.

Step S818: Utilize the digital control unit to detect if the power switch of the control panel is powered on or off by the user to determine whether or not to provide the control panel with system power. If the power switch of the control panel is powered off, perform Step S824; on the contrary, if the power switch of the control panel is powered on, perform Step S836.

Step S820: Measure a predetermined response time of RS-232.

Step S822: Utilize the digital control unit based on the timing result of Step S820—time out—to detect if the control panel malfunctions, such as system crushes, to determine if the control panel should restart. If so, it represents that the control panel has probably crushed, so perform Step S832; if not, perform Step S836.

Step S824: Stop provide the control panel with power and then perform Step S826 even if the digital control unit maintains idle mode.

Step S828: The user presets a reservation time via the control panel to perform at least one reservation function icon.

Step S830: Determine if the reservation function is set based on an appointed time in order to perform functions according to the predetermined time and the set items; for example, the blower performs the one-minute "daily dry cycle" function on an appointed and fixed duration every day. Whether or not the power switch of the control panel is powered off by the user at this time, the digital control unit restarts to supply the control panel power to initialize the control panel and to awaken the digital control unit to perform the reservation function "daily dry cycle." After the reservation function is performed, the digital control unit stops providing the control panel with power if it does not detect that the user turn on the power switch. Therefore, if there is a reservation function, perform Step S838; if there is no reservation function, loop back to Step S824, that is, stopping providing the control panel with power and compelling the digital control unit to go back to idle mode.

Step S832: The digital control unit deals with emergency shutdown mode and subsequently performs Step S834, that is, powering off the system power and restarting the control panel. After restarting, loop back to Step S808.

Step S836: Represent the whole system is in a normal mode. When the user does not utilize the present system over a period of time, the system process will go back to Step S812 even if the control panel automatically returns to the function menu again.

Step S838: As Step S808, the digital control unit provides the control panel with system power. And subsequently, perform Step S840. As the above-mentioned Step 810, initialize the control panel and awaken the digital control unit in order to perform the above-mentioned Step 816; that is, the digital control unit performs the configured function icon via the control panel according to the reservation function. In the following, the other processes or steps are the same as the above-mentioned ones, so no further details are provided here.

Figure 4:
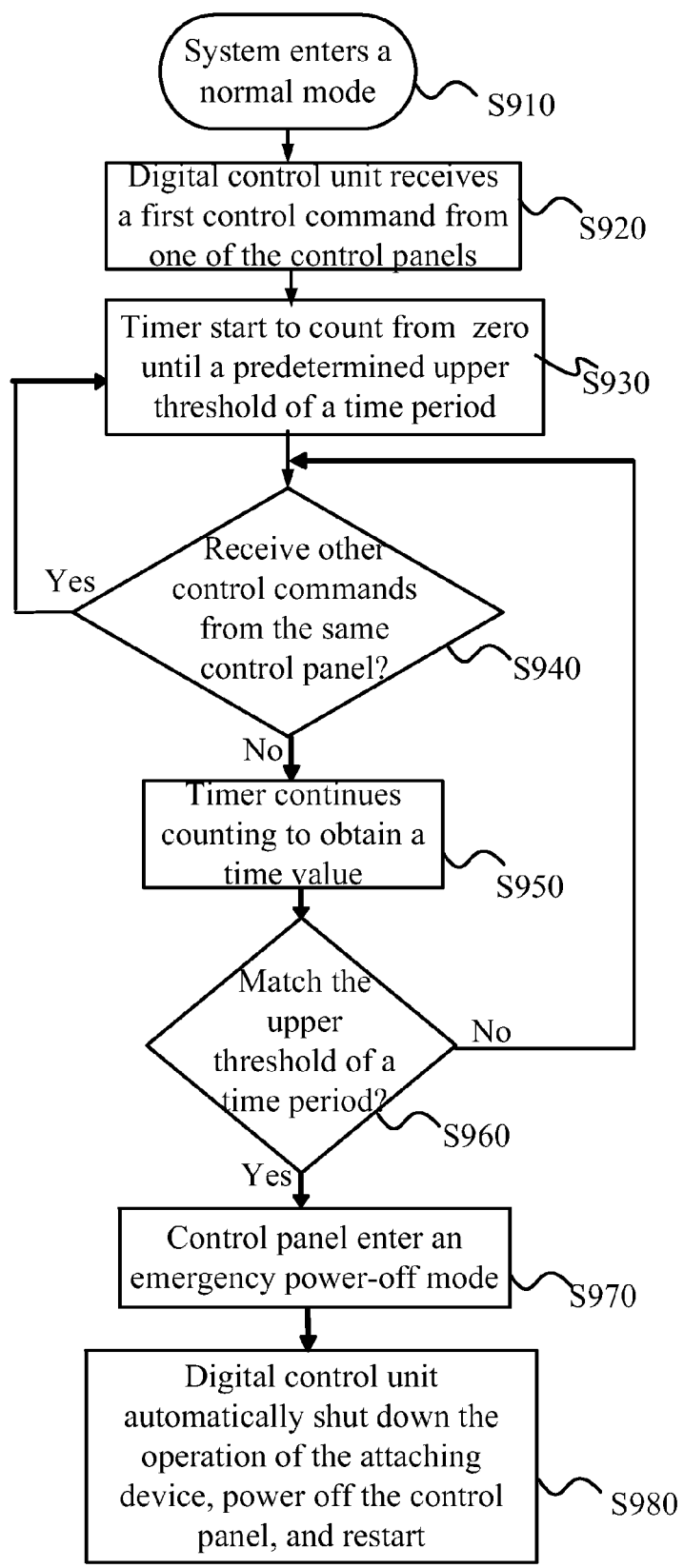
FIG. 4 illustrates a flowchart of another method for controlling the massage bathtub automatic control system which is applied to a massage bathtub according to another preferred embodiment of the present invention.

In addition, as shown in FIG. 4, the massage bathtub automatic control method of another embodiment of the present invention is employed in a massage bathtub automatic control system (as shown in FIG. 1 and FIG. 2) to control and connect a massage bathtub with a plurality of attaching devices. The method comprises the following steps:

Step S910: The system enters a normal mode and provides a plurality of timers for a single digital control unit to individually detect program operations of a plurality of control panels and debug programs.

Step S920: The digital control unit receives a first control command transmitted from any one of the control panels via a first interface bus (e.g., RS232). The digital control unit, however, can utilize other various interface buss such as a wireless transmission module, RS232, RS486, USB, and so on, to connect signals of other control panels.

Step S930: When the digital control unit receives the above-mentioned control command, one of the corresponding timers starts to count from a starting value (e.g., zero) until a predetermined upper threshold of a time period.

Step S940: The digital control unit determines to receive other following control commands from the same control panel during the process of counting mentioned above. If so, loop back to Step S930; that is, the timer returns to the starting value (e.g., zero) and restarts to count from the starting value. If not, go to Step S950.

Step S950: The timer continues counting to obtain a time value.

Step S960: The digital control unit determines if the time value matches the predetermined upper threshold of a time period. If so, the digital control unit determines that the program operation of the control panel has failed or has become abnormal and then performs Step S970. If not, go back to Step S940; that is, the timer continues counting to update the time value.

Step S970: When the digital control unit determines that the program operation of the control panel has failed, the control panel enters an emergency power-off mode.

Step S980: The digital control unit automatically shuts down the operation of the attaching device, powers off the control panel, and restarts the control panel.

From the description mentioned above, the massage bathtub automatic control system and method thereto of the present invention utilizes a control panel connecting a visual-displaying unit (e.g., an LCD) to produce a function menu frame via a highly operated graphical user interface (GUI). The function menu frame combines various function icons so that the user can make selections directly without restriction and quickly manipulate all of the attaching devices of the massage bathtub. Because the plurality of function icons correspond to the operation of one of the attaching devices of the massage bathtub or the combinational operation of some of the attaching devices of the massage bathtub, the user can operate the massage bathtub quickly and easily and supervise control effects anytime.

Meanwhile, the control panel of the present invention connects a digital control unit to integrate the functions of all of the attaching devices of the massage bathtub and to provide an automatic system detection and feedback, so it is unnecessary for the user to particularly memorize a best or most preferred control setting combination to adjust all of the functions one by one.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structures.

What is claimed is:

1. A massage bathtub automatic control system for use in a massage bathtub with a plurality of attaching devices, comprising:
a control panel comprising a visual-displaying unit and a master control device connected to an input device wherein the master control device comprises a first interface bus, a microprocessor, and a memory providing the visual-displaying unit with an information, based on a control of the microprocessor, to show a function menu comprising a plurality of function icons, one of which has a set item corresponding to an operation of the attaching devices in single or combination, and the microprocessor transmits a control command to the first interface bus in response to the set item which is selected or/and set by the input device; and
a digital control unit comprising a microcontroller which controls the operation of the attaching devices in single or combination, based on the control command from the first interface bus, and accordingly returns an operational result of the corresponding attaching device to the control panel.

2. The massage bathtub automatic control system of claim 1, wherein the plurality of attaching devices comprises a blower, a motor, at least one air valve, light units, at least one pump, a heater, at least one sensor, a timing device, and a spa device.

3. The massage bathtub automatic control system of claim 2 further comprising a pump management subsystem, a blower management subsystem, an air valve management subsystem, a light unit management subsystem, a heater management subsystem, each for managing the corresponding attaching device and linking to a corresponding function icon of the function menu to be selected and/or to be set by the input device.

4. The massage bathtub automatic control system of claim 3, wherein the memory of the control panel further stores an operating system, a hardware drive unit, and a human-computer interface for utilizing the information to show the function menu on the visual-displaying unit and/or forming at least one setting status corresponding to one of the set items of a specific function icon which is selected or/and set by the input device, whereby the setting status of the selected set item is treated as a latest configuration value to be stored in the memory, and the control command corresponding to the setting status is generated by the hardware driving unit and the human-computer interface.

5. The massage bathtub automatic control system of claim 4, wherein the setting status of the selected set item is shown on the function menu.

6. The massage bathtub automatic control system of claim 4, wherein the setting status of the set item comprises a single setting or a combinational setting of a variable parameter value, a fixed parameter value, a variable ratio value and a fixed ratio value.

7. The massage bathtub automatic control system of claim 6, wherein the parameter value represents a lamp color, a speed, a brightness, a time, a temperature, an air flowing amount, or an on/off state.

8. The massage bathtub automatic control system of claim 4 further comprising a primary management subsystem linking to a set item used to combine the setting statuses of one of the other set items, so as to perform a combinational operation of a device cluster grouped by at least one part of the attaching devices.

9. The massage bathtub automatic control system of claim 4, wherein a primary management subsystem linking to a set item used for storing a setting status combination of the plurality of set items corresponding to a pump management subsystem, a blower management subsystem, an air valve management subsystem, a light unit management subsystem and a heater management subsystem, so that a combinational operation of a device cluster grouped by at least one part of the attaching devices is simultaneously performed.

10. The massage bathtub automatic control system of claim 1, wherein the control panel is a portable wireless remote controller having a universal asynchronous receiver/transmitter (UART) and a built-in wireless transmission module, and the first interface bus is a wireless transmission interface.

11. The massage bathtub automatic control system of claim 2, wherein the digital control unit further comprises:
   a plurality of control logics and/or driving elements for performing the operation of the attaching devices and returning the operational results of the attaching devices; and
   a core unit disposed in the microprocessor and used to coordinate the control logics and/or driving elements to control the operation of the attaching devices of the massage bathtub depending on the control command transmitted from the control panel via the first interface bus, and returning the operational result of the attaching devices to the control panel.

12. The massage bathtub automatic control system of claim 11, wherein the digital control unit further comprises a second interface bus using an identical communication protocol as the first interface bus, and is utilized to transmit one of control information or operational results generated among the attaching devices and the control logics and/or driving elements.

13. The massage bathtub automatic control system of claim 11, wherein the digital control unit further comprises a second interface bus having a wireless transmission module for wirelessly transmitting one of control information or operational results generated among the attaching devices and the control logics and/or driving elements.

14. A method of automatically controlling a massage bathtub connecting a plurality of attaching devices, the method comprising:
   providing a digital control unit and a control panel comprising a visual-displaying unit and a master control device connected to an input device;
   turning on a power switch on the control panel to initialize the control panel;
   showing a function menu on the visual-displaying unit, the function menu comprising a plurality of set items each corresponding to an operation of the attaching devices in single or combination;
   selecting one of the set item by using the input device to generate a control command via the master control device; and
   the digital control unit controlling an operation of one of the attaching devices based on the control command, and then returning the operational result of the attaching device to the control panel.

15. The method of claim 14, wherein the plurality of attaching devices comprises a blower, a motor, an air valve, a light unit, a pump, a heater, a sensor, a timing device, and a spa device.

16. The method of claim 15, wherein the step of selecting one of the set items by using the input device further comprises:
   forming at least one setting status of a attaching device corresponding to the set item which is selected or/and set by the input device; and
   treating the at least one setting status to be a latest configuration value for being stored in a memory.

17. The method of claim 14 further comprising:
   showing the operational result of the corresponding attaching device on the function menu by using the visual-displaying unit.

18. The method of claim 14 further comprising:
   providing a pump management subsystem, a blower management subsystem, an air valve management subsystem, a light unit management subsystem, a heater management subsystem, each for managing the corresponding attaching device and linking to a corresponding function icon of the function menu to be selected and/or to be set by the input device.

19. The method of claim 18 further comprising:
   providing a primary management subsystem linking to a set item for storing a setting status combination of the plurality of set items corresponding to a pump management subsystem, a blower management subsystem, an air valve management subsystem, a light unit management subsystem, and a heater management subsystem into the memory, so that a combinational operation of a device cluster grouped by at least one part of attaching devices is simultaneously performed.

20. A method of automatically controlling an automatic control system for use in a massage bathtub connecting a plurality of attaching devices, the method comprising:
   providing a digital control unit configuring a plurality of timers to detect a plurality of control panel simultaneously, when the system operates under a normal mode;
   when the digital control unit receives a control command from one of the control panels via a first interface bus, one of the timers starts to count from a starting value until a predetermined upper threshold of a time period;
   if the digital control unit receives other following control commands from the same control panel during the process of counting, the timer returns to the starting value and restarts to count from the starting value;
   if the digital control unit does not receive other following control commands from the same control panel during the process of counting, the timer continues counting to obtain a time value;
   if the digital control unit determines that a program operation of the control panel fails due to the time value in excess of the predetermined upper threshold of the time period, the control panel enters an emergency power-off mode which comprises automatic shutdown of the attaching device, power-off the control panel and restarting the control panel; and
   if the digital control unit determines the time value does not exceed the predetermined upper threshold of the time period, the timer continues counting.

* * * * *